United States Patent
Owen et al.

(10) Patent No.: US 12,523,243 B2
(45) Date of Patent: Jan. 13, 2026

(54) OVERHEAD RAIL ATTACHMENT

(71) Applicant: KEE SAFETY LIMITED, Cradley Heath (GB)

(72) Inventors: Stuart Owen, Stourbridge (GB); William Parsons, Slough (GB)

(73) Assignee: KEE SAFETY LIMITED, Cradley Heath (GB)

( * ) Notice: Subject to any disclaimer, the term of this patent is extended or adjusted under 35 U.S.C. 154(b) by 108 days.

(21) Appl. No.: 18/546,013

(22) PCT Filed: Feb. 9, 2022

(86) PCT No.: PCT/GB2022/000017
§ 371 (c)(1),
(2) Date: Aug. 10, 2023

(87) PCT Pub. No.: WO2022/171973
PCT Pub. Date: Aug. 18, 2022

(65) Prior Publication Data
US 2024/0133403 A1    Apr. 25, 2024
US 2024/0229836 A9    Jul. 11, 2024

(30) Foreign Application Priority Data

Feb. 12, 2021  (GB) ..................... 2101956

(51) Int. Cl.
*F16B 2/06*   (2006.01)
*F16B 9/00*   (2006.01)
*F16B 11/00*  (2006.01)

(52) U.S. Cl.
CPC .............. *F16B 2/065* (2013.01); *F16B 9/054* (2018.08); *F16B 11/002* (2013.01); *F16B 2200/403* (2018.08); *F16B 2200/67* (2023.08)

(58) Field of Classification Search
CPC .... F16B 2/065; F16B 9/054; F16B 2200/403; F16B 2200/67; F16B 11/002; E01B 25/22; E01B 25/24; E05D 15/0652
See application file for complete search history.

(56) References Cited

U.S. PATENT DOCUMENTS 1,759,213 A  *  5/1930  Webb ..................... B65G 9/008
                                                      104/111
1,791,527 A  *  2/1931  Hoffman ............. E05D 15/0652
                                                      104/108
(Continued)

FOREIGN PATENT DOCUMENTS

BR      8502185 U     6/2007
EP      1485563 B1    4/2007
(Continued)

OTHER PUBLICATIONS

International Search Report for PCT/GB2022/000017 mailed Nov. 5, 2022, 2 pages.
(Continued)

*Primary Examiner* — Eret C McNichols
(74) *Attorney, Agent, or Firm* — NIXON & VANDERHYE (57) ABSTRACT

A rail attachment for supporting a support rail includes two rail brackets engaging with and securing the support rail therebetween, a connector securing the two rail brackets to one another and including an attachment unit suspending the rail brackets and support rail, each the rail bracket including a support section engaging and secured to the support rail and each bracket further including a first connection section extending over the support rail, an intermediate region and a distal region whereby the distal region is spaced from the support section by the intermediate section and wherein the distal region is of a greater length than the intermediate region as considered in a direction perpendicular to the (Continued)

direction in which the intermediate region spaces the distal region from the support section, and the connector including a second connection section securing the distal regions of the rail engagement brackets relative to one another.

20 Claims, 6 Drawing Sheets

(56) References Cited

U.S. PATENT DOCUMENTS

| | | | | |
|---|---|---|---|---|
| 1,867,226 | A * | 7/1932 | Martin | B62D 21/00 403/171 |
| 2,562,406 | A * | 7/1951 | Barker | B65G 21/22 104/111 |
| 2,791,461 | A * | 5/1957 | Goldenberg | B66C 7/00 104/258 |
| 3,278,980 | A * | 10/1966 | Donovan | E05D 15/26 16/87.4 R |
| 3,431,585 | A * | 3/1969 | Foltz | E05D 15/0652 248/323 |
| 3,468,509 | A * | 9/1969 | Foltz | E05D 15/0652 211/162 |
| 4,344,206 | A * | 8/1982 | Hermanson | E05D 15/0652 16/94 R |
| 4,845,807 | A * | 7/1989 | Rooney | E05D 15/0652 248/222.51 |
| 5,398,902 | A * | 3/1995 | Crowe | E05D 15/0652 248/300 |
| 5,598,785 | A * | 2/1997 | Zaguroli, Jr. | E01B 25/24 104/111 |
| 6,357,079 | B1 * | 3/2002 | Hsu | A47H 1/14 248/262 |
| D628,057 | S * | 11/2010 | Benne | D8/394 |
| 11,820,630 | B2 * | 11/2023 | Zaguroli, Jr. | B66C 7/02 |
| 2009/0172927 | A1 * | 7/2009 | Chen | F16M 13/022 24/456 |

FOREIGN PATENT DOCUMENTS

| | | |
|---|---|---|
| EP | 3409325 A1 | 12/2018 |
| WO | 2007148207 A2 | 12/2007 |

OTHER PUBLICATIONS

Great Britain Search Report for GB2101956.7 dated Aug. 10, 2021, 1 pages.

Written Opinion of the International Searching Authority for PCT/GB2022/000017 mailed Nov. 5, 2022, 8 pages.

* cited by examiner

OVERHEAD RAIL ATTACHMENT

CROSS-REFERENCE TO RELATED APPLICATIONS

This application is the US national stage of PCT/GB2022/000017, filed Feb. 9, 2022 and designating the United States, which claims the priority of GB 2101956.7, filed Feb. 12, 2021. The entire contents of each foregoing application are incorporated herein by reference.

BACKGROUND OF THE INVENTION

Field of the Invention

This invention relates to a rail attachment for support of an overhead rail.

Description of the Related Art

Overhead rails are employed in many different situations including, for example, lightweight installations for the support of a curtain or similar screen. They are employed also in relatively heavy duty installations such as serving as a guide track for a so-called traveller which is part of a fall arrest system.

Many designs of rail attachments are known and often are of a design that requires them to be slid into position along the length of a track. Often that is not convenient, and especially so in the case of a requirement to retrofit a rail attachment to an existing installation when changes are made to a structure that is supporting the track. For that reason it is known to provide rail attachments of a so-call two part type comprising two parts that co-operate with one another to clamp or otherwise locate a rail therebetween.

Examples of known two part rail attachments for an overhead rail are described in U.S. Ser. No. 01/759,213, U.S. Ser. No. 01/791,527 and U.S. Ser. No. 02/791,461.

Although designs of so-called two part type clamps can function satisfactorily to provide support for a rail they are not always convenient for use by an installer or are of a relatively complex and expensive construction. A further disadvantage of known two part clamps is that usually they are of limited adaptability for attachment to different types and orientations of support structures.

SUMMARY OF THE INVENTION

The present invention seeks to provide an improved rail attachment that mitigates or overcomes some of the disadvantages of known two part rail attachments.

In accordance with one aspect of the present invention there is provided a rail attachment for supporting a support rail, said attachment comprising:—
a. two rail brackets in use to engage with and secure a support rail therebetween,
b. connection means for securing the two rail brackets relative to one another, said connection means comprising at least one attachment means for suspending the rail brackets and a support rail,
c. each said rail engaging bracket comprising a support section in use to engage with and be secured to a support rail,
d. each rail engaging bracket further comprising a first connection section in use for extending over a support rail,
e. said first connection sections each comprising an intermediate region and a distal region whereby the distal region is spaced from the support section by the intermediate section and wherein the distal region is of a greater length than the intermediate region as considered in a direction perpendicular to the direction in which the intermediate region spaces the distal region from the support section of the rail engagement bracket, and
f. the connection means comprising a second connection section adapted for securing the distal regions of the rail engagement brackets relative to one another.

The two rail brackets may be of identical size and construction or may differ from one another in size and construction.

Each rail bracket may comprise an integral formation of said support and first connection sections. Each rail bracket may be formed from sheet material, such as mild steel, and which has been shaped such that at least a part of the rail support section extends inclined relative to the first connection section.

For a support rail which has, in cross-section, side regions that extend substantially at right angles to a region of the rail that interconnects the side regions, the angle between the first connection section of the rail bracket and at least an adjacent part of a rail support section preferably, though not necessarily is less than 110°. However the preferred angle typically usually will depend on the cross-sectional profile of the support rail.

The connection means may comprise a connector which comprises said second connection section and an attachment means such as an attachment flange for securing to a support structure.

The connection means may comprise two connectors each for securing to each of the two rail brackets. At least one and preferably each of the connectors may comprise said attachment flange or other such attachment means. Preferably the connection means comprises two connectors of identical size and construction.

Each connector may comprise an integral formation of a second connection section and an attachment flange and wherein the second connection section is adapted for securing to the first connection section of one or each of the two rail engaging brackets. Preferably the angle between the attachment flange and second connection section is in the range 80-100°, more preferably substantially equal to 90°.

Preferably each of the first and second connection sections is formed with at least one aperture or edge recess whereby a first connection section may be secured to a second connection section by the use of a retainer, such as a nut and bolt combination and wherein the bolt extends through aligned apertures and/or edge recesses of the two connection sections. An aperture for securing together first and second connection sections may, for example, be of a circular, oval or rectangular shape. An aperture may be in the form of a slot and said slot may extend either perpendicular to a side edge of the connection section or be inclined relative thereto.

It is not essential that two connectors are provided. In an alternative construction the connection means may comprise a single connector. A single second connection section of the rail attachment may be adapted for securing to each rail engaging bracket at two spaced apart positions. The single connector may comprise an attachment means such as a flange or bracket and said attachment means may be formed integrally with the second connection section, for example by welding.

Preferably the support section of a rail bracket, or more preferably of each of the two rail brackets extends beyond the intermediate region of the bracket in a direction perpendicular to the direction in which the intermediate region spaces the distal region from the support section of the rail bracket, and in the same direction as that in which the distal region of the first connection extends from the intermediate region. Preferably the distal region of the first connection section and the support section extend by substantially equal distances beyond the intermediate region of the connection section.

Preferably an upper edge of that part of the rail bracket support section which extends from the intermediate region lies closer to a lower edge of the support section than the intermediate region of the first connection section. Thus preferably said upper edge is spaced from a plane containing the upper surface of the intermediate region by a distance greater than the thickness of the intermediate region.

The lower edge of the support section and regions adjacent thereto may be profiled to engage with a part of a support rail. The invention provides also an assembly of a rail attachment in accordance with the present invention and a support rail wherein the support section of the rail attachment and regions adjacent that support section are profiled to engage with the support rail.

BRIEF DESCRIPTION OF THE DRAWINGS

Embodiments of the present invention will now be described, by way of example only, with reference to the accompanying diagrammatic drawings in which:—

FIG. 3b is an isometric view in more detail of part of part of the length of the support rail of FIG. 3a;

DETAILED DESCRIPTION

Figure 1:
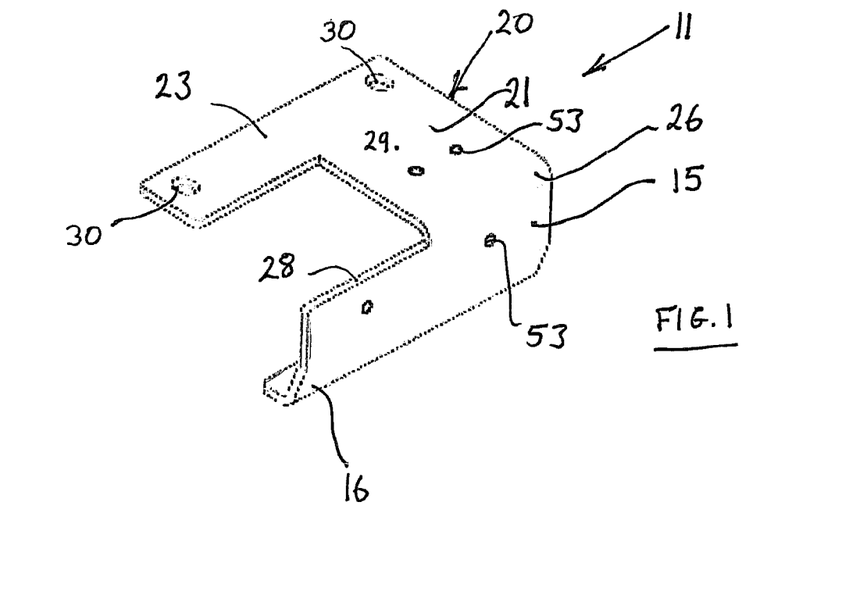
FIG. 1 is an isometric view of a rail bracket of a rail attachment in accordance with the present invention.
Figure 2:
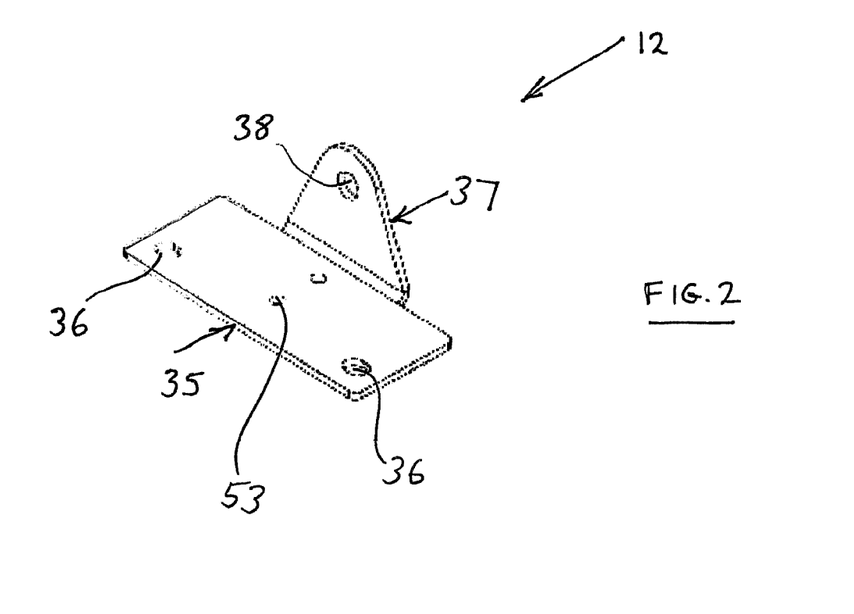
FIG. 2 is an isometric view of connection means for use in combination with the rail bracket of FIG. 1.

An overhead rail attachment 10 in accordance with a first embodiment of the present invention comprises two rail brackets 11, connection means comprising two connectors 12 and four hexagonal nut and bolt combinations 13.

Each of the rail brackets and connection means is formed by deformation of sheet material such as mild steel.

Figures 3A, 3C:
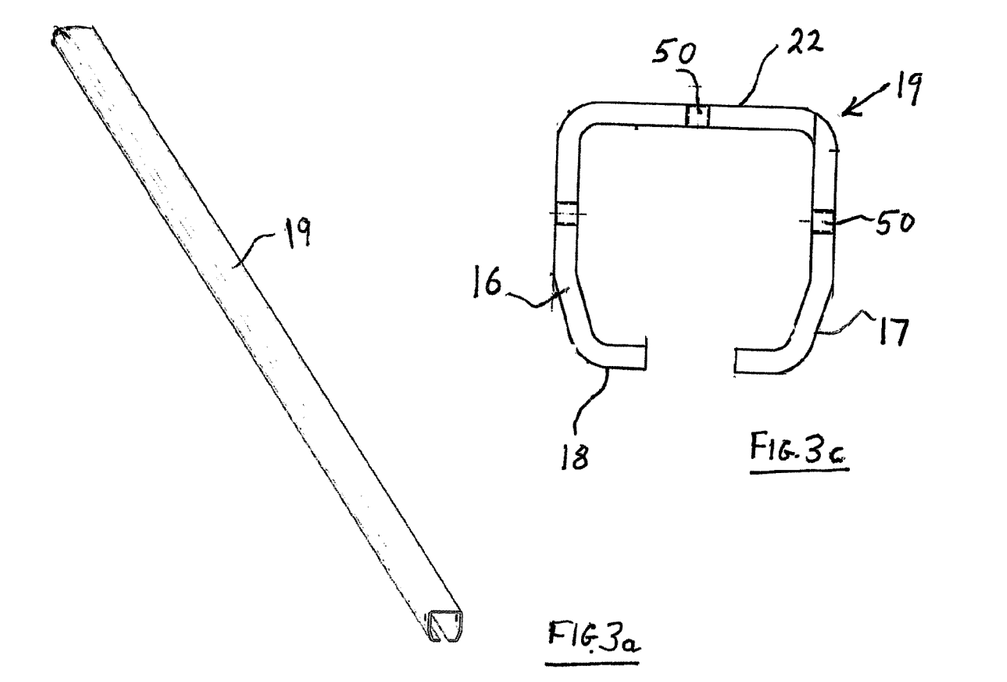
FIG. 3a is an isometric view of a support rail to which a pair of rail brackets may be secured.
FIG. 3c is a cross-sectional view of the support rail of FIG. 3b.
Figure 3B:
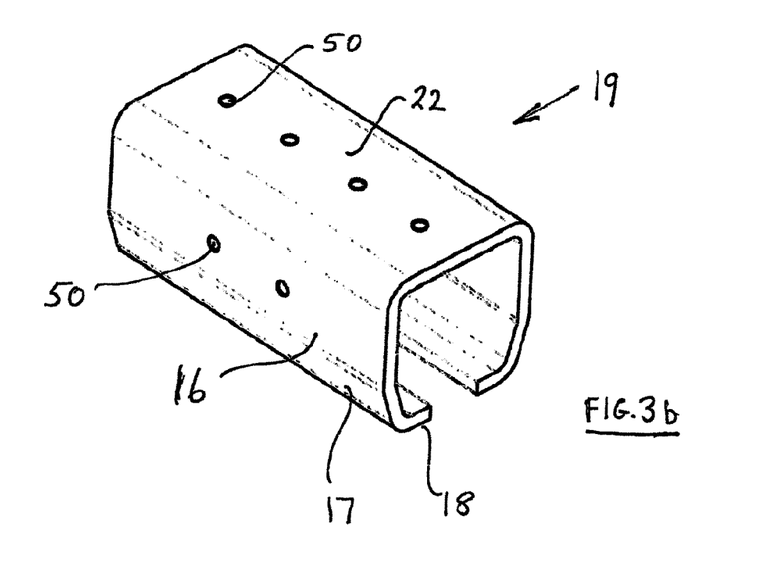

Each rail bracket 11 comprises a support section 15 having a lower edge region 16 which is shaped to conform to the side wall 17 and lower edge region 18 of the support rail 19 shown in FIGS. 3b and 3c The support section 15 extends substantially at right angles from a first connection section 20 of the rail bracket. The first connection section 20 comprises an intermediate region 21 which, in use, is intended to extend over the upper surface 22 of the support rail 19. The intermediate region 21 extends between the support section 15 and a distal region 23 of the connection section. The two regions 21, 23 of the first connection section are co-planar and the adjacent part of the support section 15 extends substantially at right angles relative to the first connection section.

The distal region and the support section 21 each have a length which, in this example, is twice that of the fold line 26 between the first connection section 20 and the adjacent part of the support section 15. Additionally the support section 15 has an upper edge 28 which is closer to the profiled lower edge region 16 than the distance between the fold line 26 and the region 16. In particular, the upper edge 28 is spaced from an upper surface 29 of the first connection section by a distance greater than the thickness of the first connection section.

The rail bracket is provided with two apertures 30 through the securing means, namely the aforementioned nuts and bolts, may extend for securing the rail bracket to either one or two of the connectors 12.

Each connector 12 comprises a second connection section 35 provided with two apertures 36 spaced apart by a distance corresponding to the spacing of the apertures 30 of the rail bracket 11. The connector 12 additionally comprises an attachment flange 37 which is integral with and extends substantially at right angles relative to the second connection section 35. The attachment flange 37 is provided with an aperture 38 to facilitate connection of the rail attachment to supporting structure such as an overhead purlin.

Figure 4:
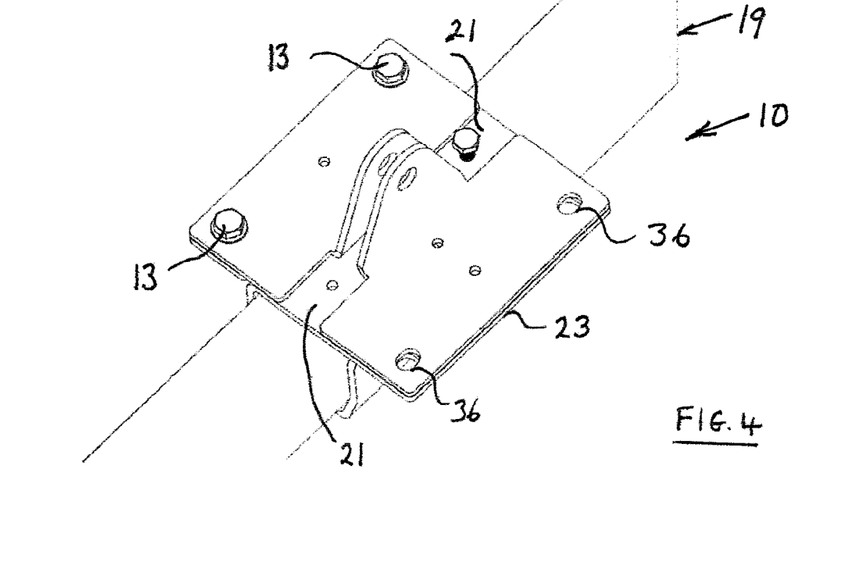
FIG. 4 shows a part-assembled rail attachment in a first orientation in situ on a support rail.

FIG. 4 shows a part-assembled rail attachment 10 comprising the aforedescribed pairs of rail brackets 11 and two connectors 12 in situ with a support rail 19.

In FIG. 4 there is shown a pair of connectors 12 each positioned over a distal region 23 of a respective one of two rail brackets 11. In FIG. 4 one of the connectors 12 is illustrated with a pair of bolts 13 that extend through apertures in the connectors and the rail bracket whereby the bolts and associated nuts enable the two components to be secured together. For purposes of illustration the apertures 36 in the other of the pair of connectors 12 and the rail bracket 11 are shown prior to provision of nuts and bolts to secure them together.

In this embodiment of the invention each of the connectors 12 of the connection means is dimensioned such that, in combination with the dimensioning of the rail brackets 11 and rail 19, the attachment flanges 37 are spaced apart whereby to enable the end of a purlin or other support member to be located and secured therebetween by means of a fastener extending through two attachment flange apertures 38. That fastener also serves to retain the two rail brackets 11 in position relative to one another and in engagement with the side walls 17 and lower edges 18 of the rail 19.

The aforedescribed pairs of rail brackets and connectors 12 may be assembled in an orientation different from that of FIG. 4, as illustrated with reference to FIG. 5. In this alternative orientation each connector 12 engages with the two rail brackets 11 to retain them in position adjacent the sides of the rail 19 and a fastener extending through the attachment flanges 37 serves to retain together the two rail brackets 11 thereby to prevent their separation from one another in the direction of the length of the rail.

Figure 5:
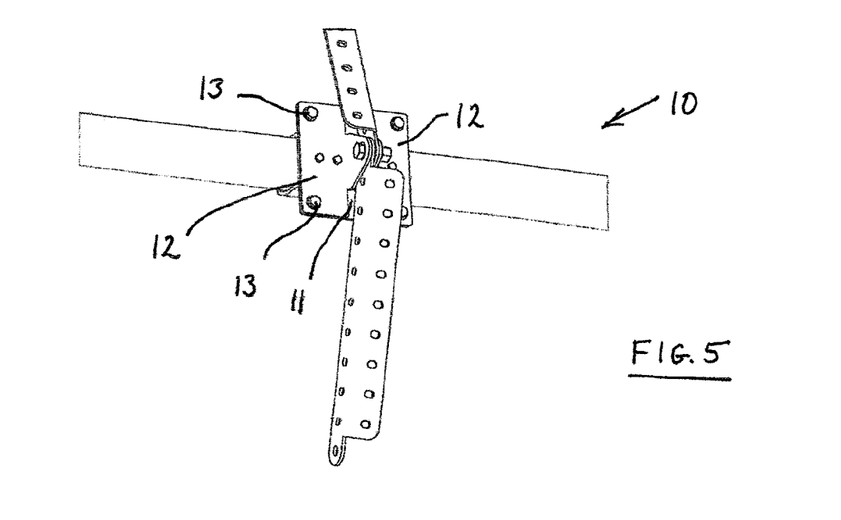
FIG. 5 shows an assembled rail attachment in situ in a second orientation on a support rail.
Figure 6:
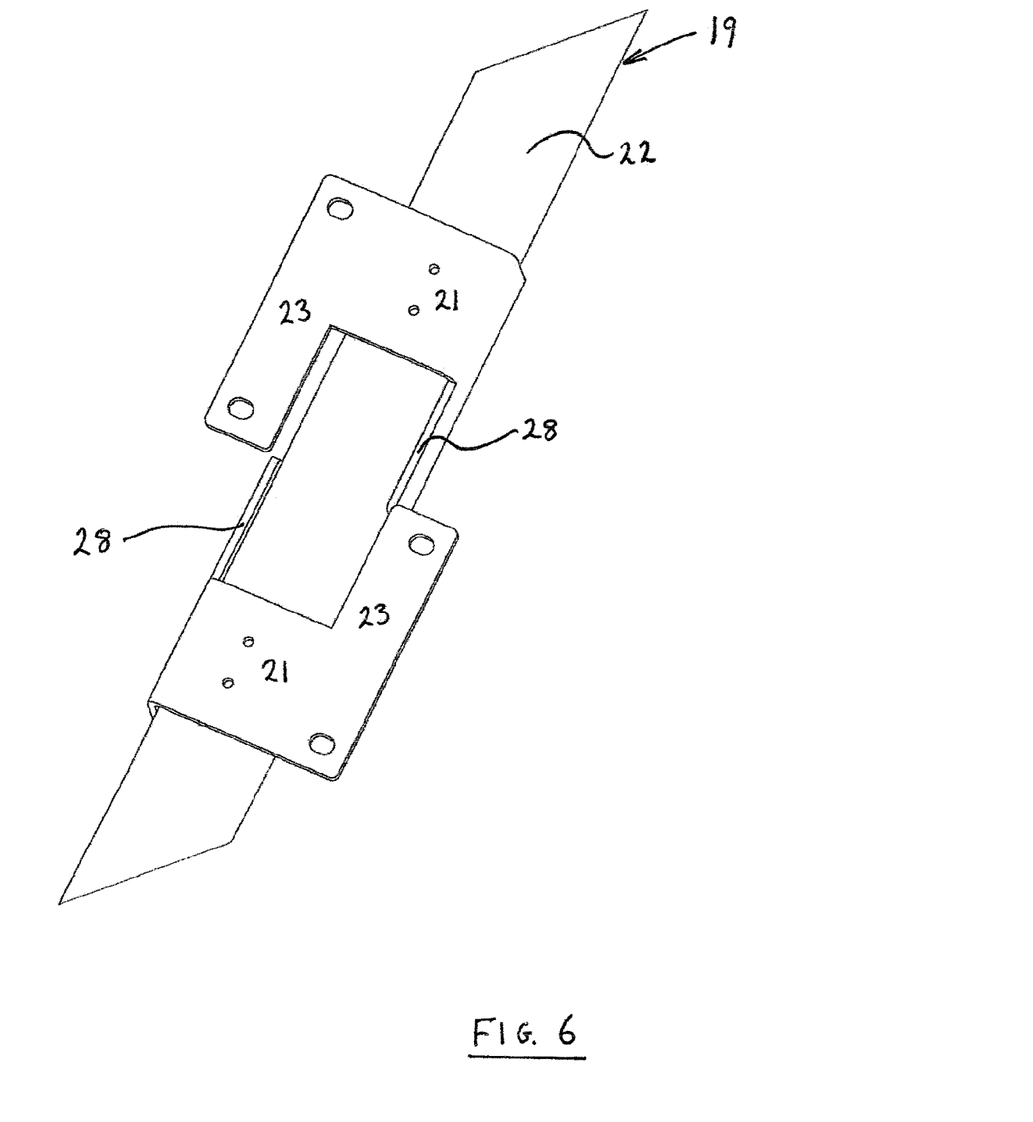
FIG. 6 shows two rail brackets in position on a support rail on a first assembly step.
Figure 7:
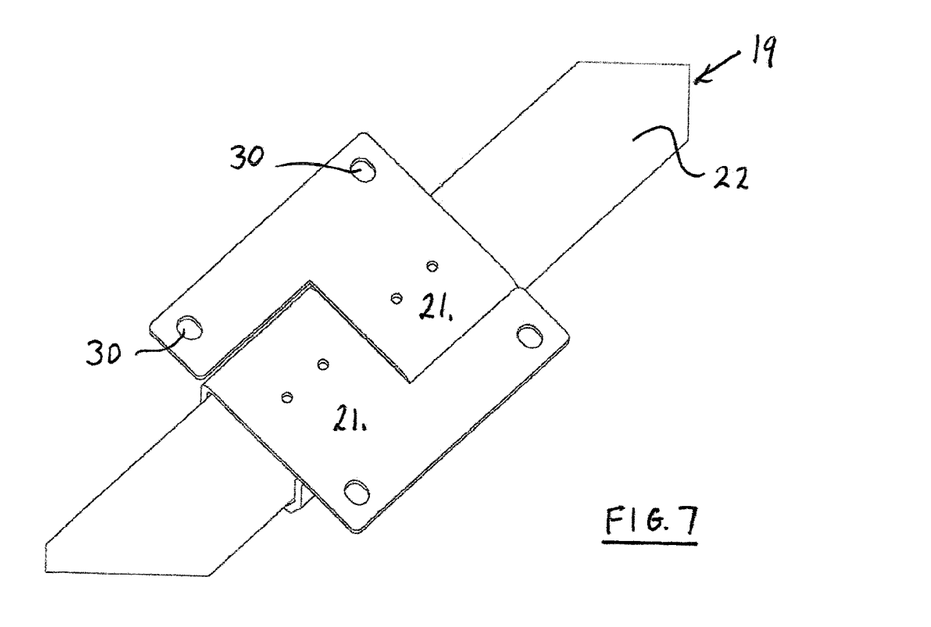
FIG. 7 shows the brackets of FIG. 6 positioned in a second assembly step.

For forming the assembly as shown in FIG. 5 the two rail brackets are each positioned spaced apart on the upper surface 22 of the rail 19 as shown in FIG. 6 and then slid towards an interlocked configuration as shown in FIG. 7.

It was described above that the upper edge 28 of a part of the support section 15 of each rail bracket 11 is spaced further from the upper face of the intermediate region 21 by a distance greater than the thickness of the connection section. It will now be evident that it is that feature which facilitates movement of the two rail brackets towards one another from the position shown in FIG. 6 to the interlocked position shown in FIG. 7.

Figure 8:
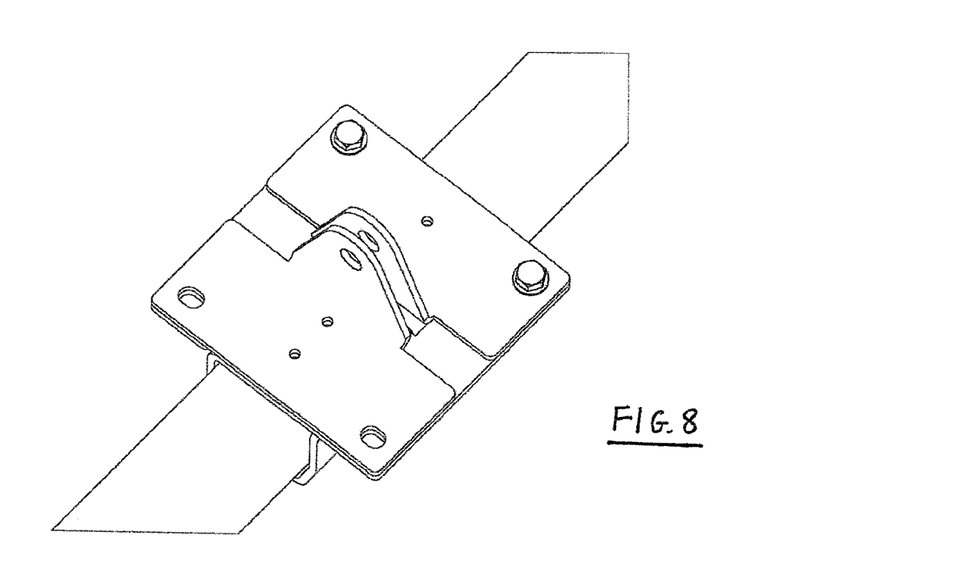
FIG. 8 shows a part-assembled rail attachment in an orientation corresponding to that of FIG. 5.

The part assembly of FIG. 7 is then provided with a pair of the connectors 12 to form the part assembly of FIG. 4 or that of FIG. 8.

Figure 9:
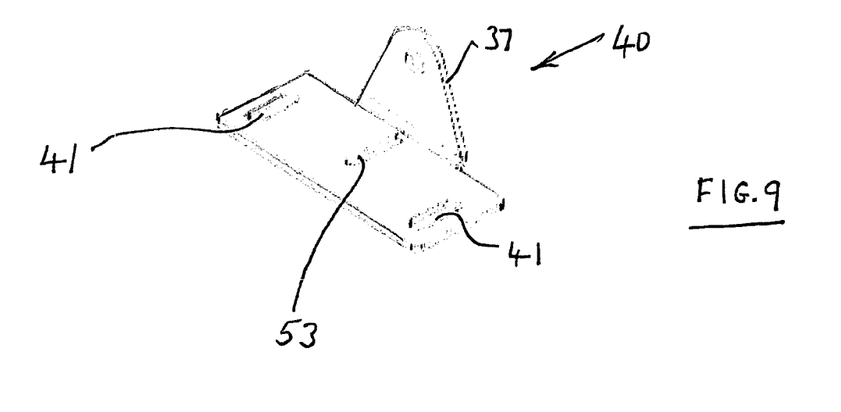
FIG. 9 is an isometric view of a connection means in accordance with a second embodiment of the invention.

In a second embodiment of the invention a rail attachment comprises two rail brackets as aforedescribed in respect of the first embodiment of the invention and two connectors 40 as shown in FIG. 9. The connectors 40 each differ from that of the first embodiment in that the circular apertures 36 of the first embodiment are replaced by elongate slots 41. The slots may extend perpendicular to an edge of a second connection section or may be inclined relative to each of two mutually perpendicular edge regions of the connection section.

The support rail may be of a type comprising small location apertures such as the apertures 50 shown in FIG. 3. These apertures may be engaged by small set screws or similar means which may extend through small apertures 53 provided in the rail brackets 11 and connection means 12, whether of a circular shape or of an elongate form as shown in the case of the connector of FIG. 9.

Figure 10:
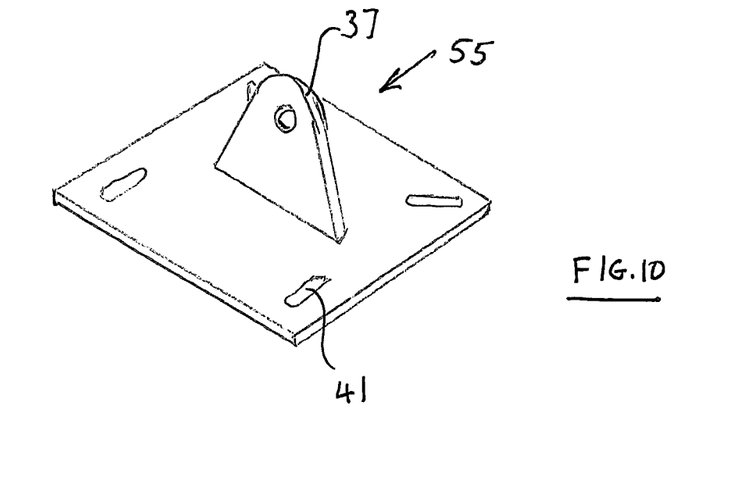
FIG. 10 is an isometric view of a rail bracket in accordance with a third embodiment of the present invention.

It is not essential that the connection means comprises two connectors 12 and in a further embodiment of the invention two of the rail brackets in the configuration of FIG. 7 may be surmounted by a single connector 55 as shown in FIG. 10. If the apertures of the rail brackets as shown in FIG. 7 are equally spaced in both the direction of the length of the support rail and perpendicular thereto, the connector 55 can be employed in a manner in which the attachment flange is either aligned with the length of the rail in a manner similar to that of the FIG. 4 configuration or perpendicular thereto in a manner similar to that of the FIG. 8 configuration.

The invention claimed is:

1. A rail attachment for supporting a support rail, said attachment comprising:
    two rail engagement brackets in use to engage with and secure a support rail therebetween,
    the attachment further comprising connection means, the connection means for engaging with and securing the two rail engagement brackets relative to one another, said connection means comprising at least one attachment means for suspending the rail engagement brackets and the support rail,
    each said rail engagement bracket comprising a support section in use to engage with and be secured to the support rail,
    each rail engagement bracket further comprising a first connection section in use for extending over the support rail,
    said first connection sections each comprising an intermediate region and a distal region whereby the distal region is spaced from the support section by the intermediate region and wherein the distal region is of a greater length than the intermediate region as considered in a direction perpendicular to the direction in which the intermediate region spaces the distal region from the support section of the rail engagement bracket, and
    the connection means comprising a second connection section adapted for securing the distal regions of the rail engagement brackets relative to one another.

2. The attachment according to claim 1 wherein the support section of a rail engagement bracket extends beyond the intermediate region of the rail engagement bracket in a direction perpendicular to the direction in which the intermediate region spaces the distal region from the support section of the rail engagement bracket and in the same direction as that in which the distal region of the connection means extends from the intermediate region.

3. The attachment according to claim 1 wherein nuts and bolts secure the two rail engagement brackets to the connection means.

4. The attachment according to claim 1 wherein the distal region of the first connection section and the support section extend by substantially equal distances beyond the intermediate region of the connection section of at least one of the two rail engagement brackets.

5. The attachment according to claim 1 wherein the support section has an upper edge and a lower edge, the upper edge of the support section extending from the intermediate region, wherein a first distance between the upper edge of the support section and the lower edge of the support section is less than a second distance between the intermediate region of the first connection section and the lower edge of the support section.

6. The attachment according to claim 1 wherein an upper edge of a part of the rail engagement bracket support section which extends from the intermediate region is spaced from a plane containing an upper surface of the intermediate region by a distance greater than a thickness of the intermediate region.

7. The attachment according to claim 1 wherein the two rail engagement brackets are of identical size and construction.

8. The attachment according to claim 1 wherein each rail engagement bracket comprises an integral formation of said support and first connection sections.

9. The attachment according to claim 1 wherein an angle between the first connection section of the rail engagement bracket and at least an adjacent part of the rail support section is less than 110°.

10. The attachment according to claim 1 wherein the connection means comprises a connector which comprises said second connection section and an attachment flange for securing to a support structure.

11. The attachment according to claim 10 wherein the second connection section of a connector is adapted for securing to the first connection section of one or each of two rail engagement brackets.

12. The attachment according to claim 1 wherein the connection means comprises two connectors each for securing to each of the two rail engagement brackets.

13. The attachment according to claim 12 wherein at least one of the connectors comprises an attachment flange.

14. The attachment according to claim 12 wherein the connection means comprises two connectors of identical size and construction.

15. The attachment according to claim 12 wherein each connector comprises an integral formation of a second connection section and an attachment flange.

16. The attachment according to claim 1 wherein the connection means comprises two connectors each for securing to a respective one of the two rail engagement brackets.

17. The attachment according to claim 1 wherein the connection means comprises a single connector.

18. The attachment according to claim 17 wherein the single connector is adapted for securing to each rail engagement bracket at two spaced apart positions.

19. The attachment according to claim 1 wherein each of the first and second connection sections is formed with at least one aperture or edge recess whereby, in use, a first connection section may be secured to a second connection section by means of a retainer which extends through aligned apertures and or edge recesses of the two connection sections.

20. A rail attachment for supporting a support rail, said attachment comprising:
two rail engagement brackets in use to engage with and secure a support rail therebetween,
connection means for securing the two rail engagement brackets relative to one another, said connection means comprising at least one attachment means for suspending the rail brackets and the support rail,
each said rail engagement bracket comprising a support section in use to engage with and be secured to the support rail,
each rail engagement bracket further comprising a first connection section in use for extending over the support rail,
said first connection sections each comprising an intermediate region and a distal region whereby the distal region is spaced from the support section by the intermediate section and wherein the distal region is of a greater length than the intermediate region as considered in a direction perpendicular to the direction in which the intermediate region spaces the distal region from the support section of the rail engagement bracket, and
the connection means comprising a second connection section adapted for securing the distal regions of the rail engagement brackets relative to one another,
wherein each rail engagement bracket is formed from sheet material and has a shape such that at least a part of the rail support section extends inclined relative to the first connection section.

* * * * *